United States Patent [19]

Rostler

[11] 4,158,139
[45] Jun. 12, 1979

[54] ISOTOPICALLY SELECTIVE EXCITATION FROM PLURAL LOW LEVELS TO DISTINCT EXCITED LEVELS

[75] Inventor: Peter S. Rostler, Arlington, Mass.

[73] Assignee: Jersey Nuclear-Avco Isotopes, Inc., Bellevue, Wash.

[21] Appl. No.: 729,892

[22] Filed: Oct. 6, 1976

[51] Int. Cl.² .............................................. H01J 39/34
[52] U.S. Cl. ................................. 250/423 P; 250/281
[58] Field of Search ..................... 250/423 P, 281, 282

[56] References Cited

U.S. PATENT DOCUMENTS 3,772,519  11/1973  Levy et al. ........................ 250/423 P

OTHER PUBLICATIONS

"The Application of Lasers to Isotope Separation", Moore, Acc. of Chem. Research, vol. 6, pp. 323-328, 1973.

Primary Examiner—Alfred E. Smith
Assistant Examiner—B. C. Anderson
Attorney, Agent, or Firm—Weingarten, Maxham & Schurgin

[57] ABSTRACT

A system for producing isotopically selective excitation of particles of a predetermined isotope type in a mixture of isotopes from plural low-lying energy levels to respective, plural excited energy levels. Ionization and separate collection of particles of the predetermined isotope type are then achieved through further excitations through a single, further excited energy state. Decay losses from the second excited energy states are reduced due to distribution of the excited particles among several states and resulting lower cross-sections for self-lasing decay.

13 Claims, 4 Drawing Figures

ISOTOPICALLY SELECTIVE EXCITATION FROM PLURAL LOW LEVELS TO DISTINCT EXCITED LEVELS

FIELD OF THE INVENTION

This invention relates to isotopically selective photoexcitation of isotopes and in particular to excitation from plural low-lying energy levels.

BACKGROUND OF THE INVENTION

The technique of isotope separation, specifically uranium enrichment, using isotopically selective photoexcitation and ionization, is, for example, shown in U.S. Pat. Nos. 3,772,519, 3,939,354, or U.S. application Ser. No. 368,298 filed June 8, 1973, all commonly assigned herewith, or in German publication No. 2,312,194. It is known that isotopically selective photoexcitation can be achieved from several low-lying energy levels, such as the ground and 620 cm$^{-1}$ levels using appropriately tuned laser radiation.

An excited state produced by the photoexcitation from the plural low-lying energy levels will typically be subject to self-lasing of the excited medium either by reflection of radiation from the boundaries of the excited medium or through sufficient amplification length of the medium. It is additionally desired that each excitation step, particularly those involving isotopic selectivity, as is the case for the excitation from the low-lying energy levels to the first excited state, have a large cross-section, that is be strongly coupled to the excited state. Plural excitation transitions to a single excited level are not, however, all likely to possess such a desired, high cross-section.

Due to theoretical particle distributions among all excited levels, the first excited level is likely to possess a high population contrasted with other levels. A single first excited state is thus likely to be strongly coupled to other, less populated energy states to which a population inversion may readily exist, thereby enhancing the potential for self-lasing decay from this single excited level.

The numbers of excited states in the typical region for a first excited state, for example below one-half of the ionization potential, is far more restricted than the numbers of states above that level in the uranium atom. This further limits the selection of states which possess the desired properties described above without any of the problems mentioned.

BRIEF SUMMARY OF THE INVENTION

In accordance with the teaching of the present invention a system of selective excitation is provided in which the goals of strong coupling or large cross-sections for excitation from plural low-lying energy levels in combination with a reduction in the tendency for self-lasing to occur from the excited level is presented. The system employs selective excitation from each of plural low-lying energy levels known to be significantly populated to separate, corresponding first excited energy levels. These excited energy levels to which excitation is achieved from each low-lying energy level may be selected with a view towards maximizing coupling to that level from the corresponding low-lying energy level and minimizing coupling, or even prohibiting coupling from the other one or more low-lying energy levels. Such a system, by distributing the particles at the first excited level amongst a plurality of distinct energy levels reduces the degree to which population inversions exist between any one individual excited energy level and a depopulated or lowly populated lower level.

From the plural, first excited energy levels, it is then advantageous to excite to a further, single excited level from which ionization can be achieved in one or more energy steps. The use of a single, further excited energy state provides a far lower self-lasing probability than those of a single, first excited energy state since it will be selected to have a significant lifetime for other reasons. This substantially necessitates that the further excited energy level will be coupled to a great many lower energy levels, keeping it from being strongly coupled to any single lower level. Furthermore, the theoretical distribution of particles amongst plural first excited levels insures that the further excited state will contain no more than one-half the number of the particles distributed amongst the first excited levels. Thus, the probability for self-lasing from the single further excited level is reduced compared to self-lasing potentials for a single first excited level.

The use of the single, upper excited level also provides the advantage of minimizing the number of additional lasers required by the use of plural, first excited levels and is thus for some reasons preferred, although the use of plural, further excited levels is not to be seen as precluded. In addition, since the number of available energy levels within the range of a typical further excited level is far greater than at a lower energy level for the uranium atom, the greater selection insures that a large cross-section or good coupling from each of the plural first excited levels to the further excited level may be more readily achieved than for excitation fron plural low-lying levels to a single first excited energy level.

Excitation to all excited energy levels, and typically ionization from the uppermost excited level, is preferably achieved using appropriately tuned lasers such as the tunable dye laser. The radiation for the first excitation steps from the plural, low-lying energy levels is typically made isotopically selective, while the other steps of photoexcitation need not be so tuned.

DESCRIPTION OF THE DRAWING

These and other features of the present invention are more fully set forth below in the exemplary and not limiting detailed description and accompanying drawing of which.

DETAILED DESCRIPTION OF THE INVENTION

The present invention contemplates a system for selective excitation of a particle type in an environment of plural particle types by excitation separately from each of plural, low-lying, normally populated energy levels to a corresponding plurality of upper excited levels in order to improve excitation cross-section and reduce the propensity for self-lasing de-excitation from the first excited state levels. The system of the present invention is particularly adapted for use in isotopically selective excitation of the fissionable uranium isotope, U-235, but may be employed in any scheme of selective excitation of atoms of molecules by electromagnetic radiation.

Figure 1:
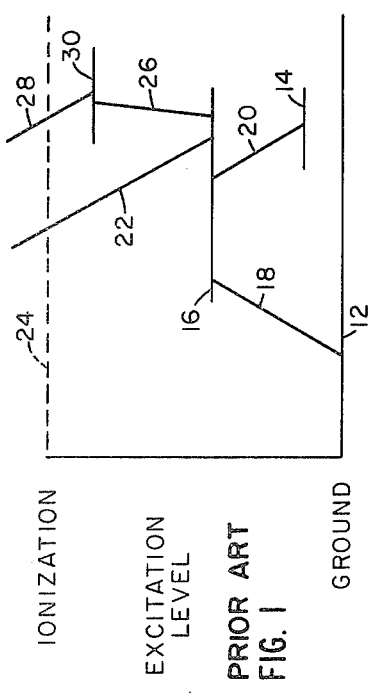
FIG. 1 is a diagram of selective photoexcitation and ionization steps according to prior techniques.

The invention may best be understood by reference to a prior technique of selective excitation presented in FIG. 1. Dealing specifically with the case of atomic uranium particles existing in a generated vapor as is described in the above-referenced U.S. patents and application, and publication, at least two low-lying energy levels, 12 and 14, which are respectively the ground and 620 cm$^{-1}$ levels, are significantly populated in the vapor. In order to improve the efficiency of uranium enrichment by selective photoexcitation, it has been proposed to excite from both of these levels 12 and 14 to a level 16 in respective transitions 18 and 20. The subsequent ionization may be achieved directly through a transition 22 to above the ionization level 24 or two energy steps 26 and 28 with a further excited energy level 30 may be employed. The particles ionized by the process of FIG. 1 are then separately directed and collected apart from the environment of uranium atoms as is taught in the above patents and described below.

The process of uranium enrichment according to the present technique depends for efficient processing upon a number of factors, two important ones of which are the minimization of de-excitation of the excited particles at the level 16, particularly by the phenomenon of self-lasing wherein the particles decay to a lower energy level to which there is a population inversion with a gain augmented by reflections from boundaries of the uranium vapor such as windows through which excitation radiation is applied, or the accumulated gain of a sufficiently long lasting path through the uranium vapor. In addition, it is important to provide a strong coupling between the levels 12 and 14 and the excited level 16 in order to secure a large cross-section or high probability of excitation to the level 16. Finally, a long lifetime in the level 16 is desired in order to improve the probability for further excitation of the particles from the level 16 to the ionization continuum directly or through the intermediate level 30.

Since the level 16 is typically near or below half of the ionization potential, which in the case of uranium is approximately three electron volts, it must be selected from a group of levels for the uranium atom in that region. The number of available levels in this region for the uranium atom is greatly lower than in higher energy regions, severely reducing the opportunity to find a level which satisfies each of the desired qualities referenced above. The need to find a level with a j value compatible for excitation from both lower levels further restricts the available levels.

Figure 2:
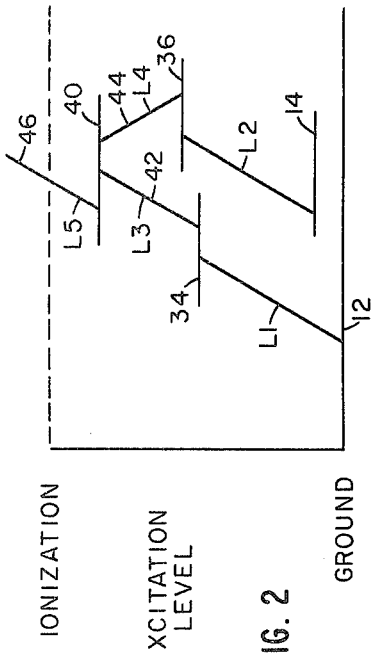
FIG. 2 is a diagram of selective excitation and ionization steps according to the present invention.

While it is normally undesirable to add further lasers or sources of excitation radiation to the system for selective uranium photoionization, the present invention proposes the addition of a further laser to the system described above as is indicated in FIG. 2 and the selective excitation from the initial levels 12 and 14 using separate lasers, L1 and L2, to separately excited energy levels 34 and 36, respectively, for the first state of excitation. The levels 34 and 36 are both typically below one-half the ionization potential. Levels 34 and 36 may be within 620 wavenumbers of each other so that all laser frequencies for steps to levels 34, 36 and 40 are near each other. The use of two (or more) levels for the first excited state from the plural, low-lying energy levels 12 and 14 achieves the advantage of distributing the excited atoms between the two levels 34 and 36. As thus distributed, the population in each level 34 and 36 is reduced over the population that would exist at a single first excited level. This reduction in population greatly reduces the tendency of self-lasing by reducing the degree of population inversion between either level 34 and 36 and a lower energy level. With separate excited levels 34 and 36 selected, it is possible to select each level for its strong coupling and large cross-section for excitation from a single, low-lying energy level, rather than having to satisfy the desired goal of a large cross-section from more than one low-lying energy level.

The use of plural levels 34 and 36 further permits selection of levels for these first excited states which not only are strongly coupled to the corresponding, populated lower energy level, but permits selection of states which are much less strongly cross-coupled to other low-lying energy levels. Additionally, while the coupling between state 12 and 34 may be large, level 34 may have no coupling with or be prohibited from low-lying energy level 14. The same can hold true for levels 36 and 12.

While it is conceivable to ionize directly from the levels 34 and 36, it is preferred to further excite the particles in the levels 34 and 36 to a further excited level 40 through respective transitions 42 and 44, before finally ionizing in one or more energy steps 46. The use of a single level 40 rather than a corresponding plurality of levels for the further excited state is preferable in that it limits to one the number of additional laser systems required for the entire isotopically selective photoionization technique in the case of uranium ionization from the two most populated low-lying energy levels 12 and 14. In addition, the potential for self-lasing from the further excited level 40 as contrasted to the first excited levels 34 and 36 is substantially reduced, due in part to the fact that the total population of the level 40 is only half of the total population of the levels 34 and 36 under conditions of radiation saturation, and in part to the fact that the level 40 being in a region far more heavily populated with available states, typically in the range of three to five electron volts, it is possible to select for the level 40 one which is not only strongly coupled to levels 34 and 36 and possessing a long lifetime to improve ionization efficiency, but one which is also coupled to many other lower energy levels, reducing the probability for self-lasing by decay to any one single lower level. Levels fulfilling the requirements of levels 34, 36 and 40 may be obtained using known spectroscopic techniques.

Figure 4:
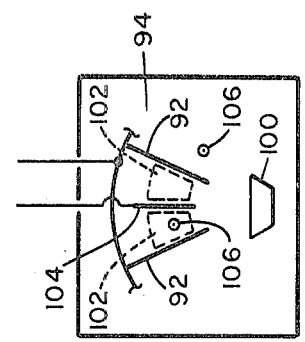
FIG. 4 is a cross-sectional view of a portion of the system diagram of FIG. 3.
Figure 3:
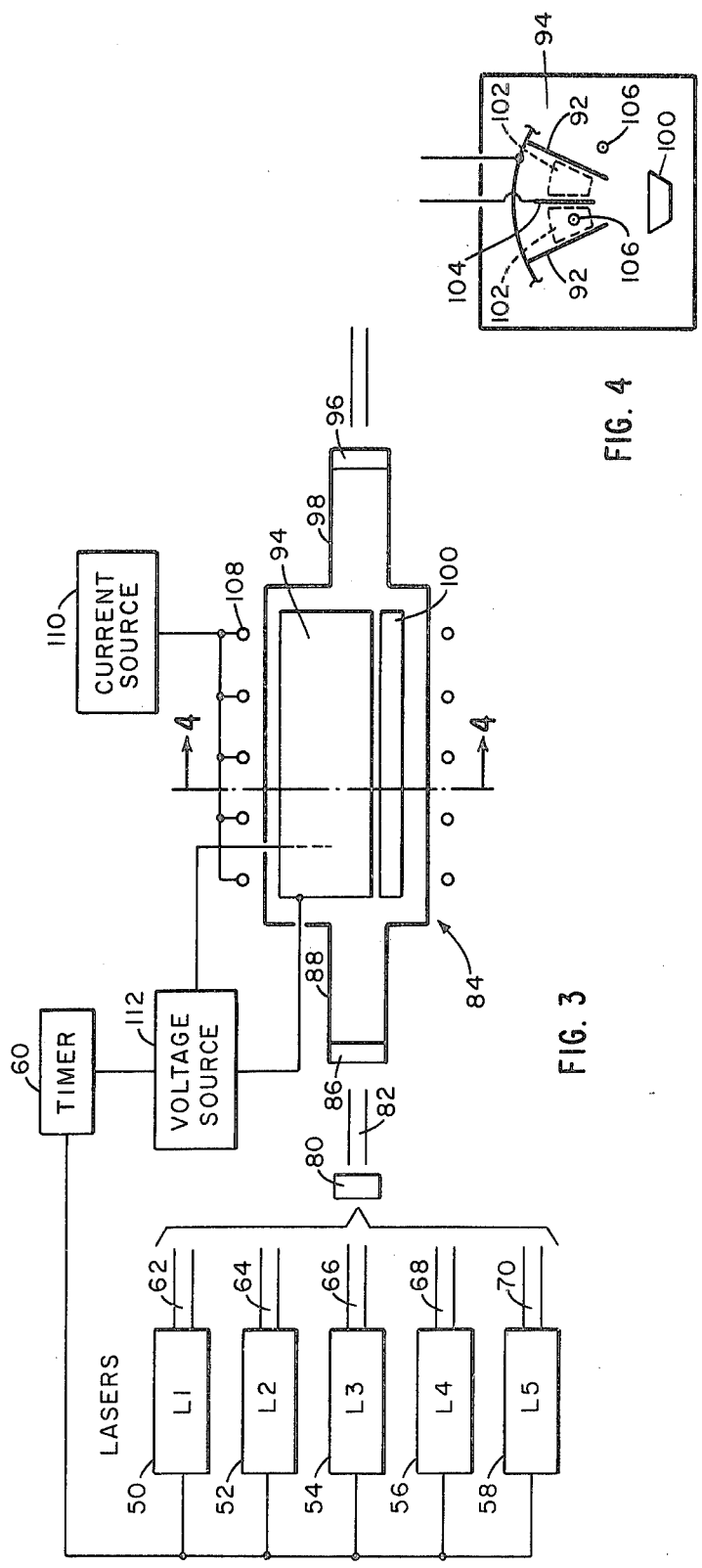
FIG. 3 is a system diagram of apparatus for practicing the present invention.

With reference to FIGS. 3 and 4, there is shown apparatus for use in practicing the method of the invention described above. The apparatus includes a plurality of laser systems 50, 52, 54, 56 and 58, each typically operating by trigger impulses from a timer 60 for simultaneous generation of laser radiation beams 62, 64, 66, 68 and 70 that are combined by a means 80 such as dichroic mirrors, or an array of beam splitters, each receiving on opposite surfaces a different radiation beam (as is described in U.S. patent application Ser. No. 660,649, filed Feb. 23, 1976). The laser systems 50 ad 52 typically comprise tunable dye lasers including several stages of laser amplification and pulse stretching as is found desirable and illustrated in U.S. Pat. No. 3,944,947, commonly assigned and incorporated herein by reference. The laser systems 50 and 52 are tuned to provide in their radiation output beams 62 and 64 isotopically selective photoexcitation to levels 34 and 36 which are typically below half the ionization potential for the uranium particles in the vapor. In being so tuned, the radiation in the beams 62 and 64 is selected to correspond to an absorption line for the selected isotope, typically the U-235 isotope, without correspondingly encompassing the absorption line for other isotopes, typically U-238. Accordingly, the levels 34 and 36 are further selected for a sufficient isotope shift (typically a small fraction of an Angstrom) to permit selective excitation of the one isotope type to the corresponding levels.

The laser systems 54 and 56 may also be tunable dye lasers of the general type discussed above, but need not provide in the radiation beams 66 ad 68 isotopic selectivity of tune to produce excitation from the levels 34 and 36 to the level 40. Their frequencies should avoid resonance with U-238 atoms in low levels, however. The frequency of the radiation in beams 66 and 68 is again selected to excite to a level 40 somewhere in the range preferably of three to five electron volts. Finally, the laser system 58 is provided for ionization from the level 40 and may include also a tunable dye laser and associated dye laser amplifier or other laser scheme as desired. The photon energy or frequency of the beam 70 provided by the laser system 58 is selected to be sufficient to ionize particles from the level 40 and in accordingly then provided with a photon energy typically in the range of one to three electron volts.

The beams 62, 64, 66, 68 and 70 combined in the combining system 80 produce a composite beam 82 which is applied to an enrichment chamber 84, for example through a window 86 on an extension pipe 88 for application between the plates 90 and 92 (shown end-on in FIG. 4) of a portion of a crossed-field accelerator system 94. The beam 82 subsequently exits the chamber through a further window 96 on an extension pipe 98 for use in one or more similar chambers as is desired. The beam 82 is preferred to produce simultaneous population of levels 12, 14, 34, 36, and 40 as by providing the beam 62, 64, 66, 68 and 70 simultaneously.

Vapor is generated and applied to crossed-field accelerating system 94 by a vapor source 100 which is typically a linear electron beam evaporation source as is known in the art. The radiation beam 82 typically illuminates one or more regions 102, by typically a plurality of axial reflections between plates 90 ad 92 on either side of the central electrode 104. While additional chambers are preferably employed using further plates similar to plates 90 and 92 circumferentially disposed around the uranium vapor expanding from the vapor source 100, only a single such chamber is illustrated in FIG. 4 for purposes of simplicity.

Particles ionized within the region 102 are accelerated towards the plates 90 and 92 by the combination of a magnetic field 106 produced in the region between the plates 90 and 92 such as by a plurality of current carrying coils 108 surrounding the chamber 84 and excited by a current source 110 in combination with a pulsed electric field applied between the electrode 104 and plates 90 and 92 by a voltage source 112. The voltage source 112, is activated to apply the electric field pulse directly subsequent to each pulse of laser radiation in the composite beam 82.

The above-described preferred embodiment of the present invention is intended to be illustrative only in both method and apparatus, the actual scope of the invention to be determined only in accordance with the following claims.

What is claimed is:

1. A method of isotopically selective excitation of particles populating plural low-lying energy levels in plural isotope types, said method comprising the steps of:
    selectively exciting particles of a predetermined isotope type from a first low-lying energy level to a first level;
    selectively exciting particles of said predetermined isotope type from a second, low-lying energy state to a second, distinct excited level.
2. The process of claim 1 wherein:
    said first excited level is strongly coupled to said first low-lying energy level, but not to said second low-lying energy level; and
    said second excited level is strongly coupled to said second low-lying energy level, but not to said first low-lying energy level.
3. The method of claim 2 wherein said first excited energy level is a prohibited state of excitation from said second low-lying energy level, and said second excited energy level is prohibited for excitation from said first low-lying energy level.
4. The method of claim 1 further including the step of exciting particles in said first and second excited energy levels to a single third excited energy level.
5. The method of claim 4 further including the step of ionizing the particles in said third excited energy level in one or more energy steps.
6. The method of claim 1 wherein the excitation to said first and second energy levels produces coexisting populations of particles within said first and second energy levels.
7. The method of claim 1 wherein said first and second excited energy levels are at energy levels less than one-half of the ionization potential for said particles of plural isotope types.
8. The method of claim 1 wherein said particles include uranium atoms.
9. The method of claim 8 wherein said first and second excited energy states are within less than 620 wavenumbers of each other.
10. A method for selectively ionizing particles of one isotope type in an environment of particles of plural isotope types occupying plural low-lying energy levels, said method comprising the steps of:
    selectively exciting particles of a predetermined isotope type from a first low-lying energy level to a strongly coupled first excited level;
    selectively exciting particles of said predetermined isotope type from a second low-lying energy level to a strongly coupled second excited energy state;
    said first and second excited energy levels differing from each other and being coupled respectively to said second and first low-lying energy levels substantially less strongly than the coupling to said first and second low-lying energy levels respectively;
    exciting the particles in said first and second excited states to a single third excited energy level above said first and second excited energy levels;
    ionizing the particles in said third excited energy state; and
    collecting the ionized particles apart from said environment of plural isotope types.
11. The method of claim 10 wherein said steps of exciting to said first, second and third excited energy levels produces substantially simultaneous population of said first, second and third excited energy levels by particles of said predetermined isotope type.

12. The method of claim 10 wherein said particles includes plural uranium isotopes and said first and second low-lying energy levels are the ground energy level and the energy level at 620 wavenumbers.

13. Apparatus for isotopically selective excitation of particles populating plural low-lying energy levels in plural isotope types, said apparatus comprising:
  means for selectively exciting particles of a predetermined isotope type from a first low-lying energy level to a first level;
  means for selectively exciting particles of said predetermined isotope type from a second, low-lying energy state to a second, distinct excited level.

* * * * *